INVENTORS.
HUGH F. STODDART
JAMES B. WILLIAMS
ROBERT HINDEL
BY
Joseph G. Schwalbach
ATTY.

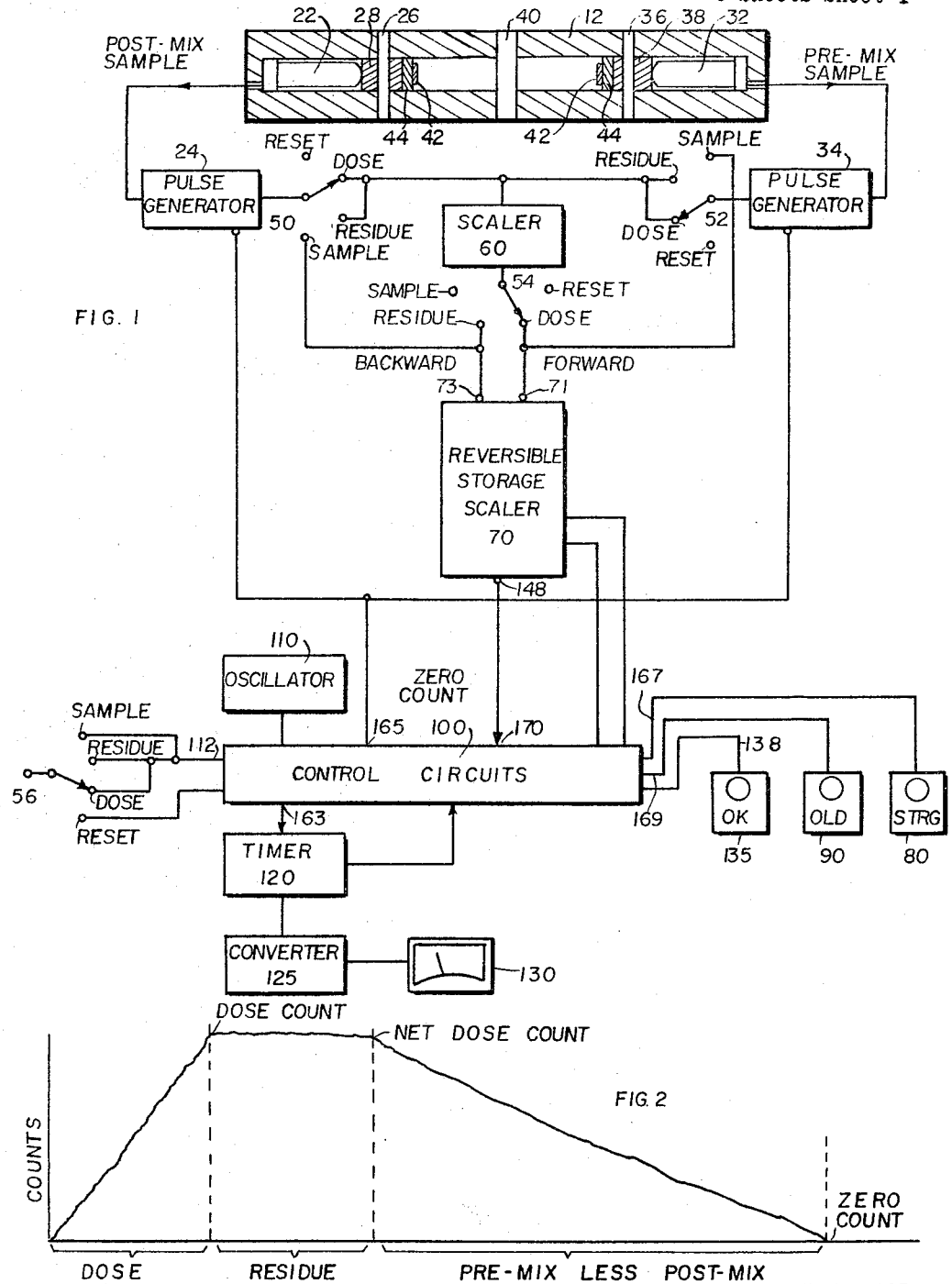

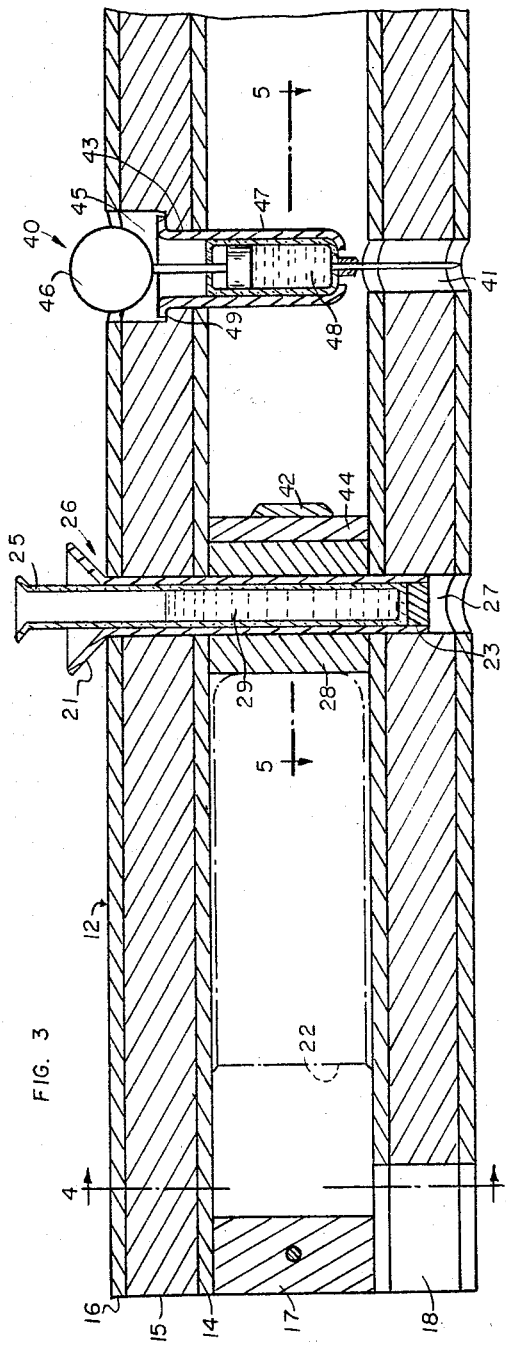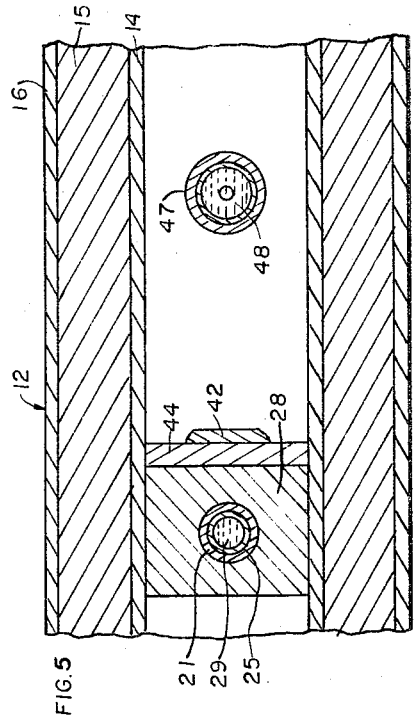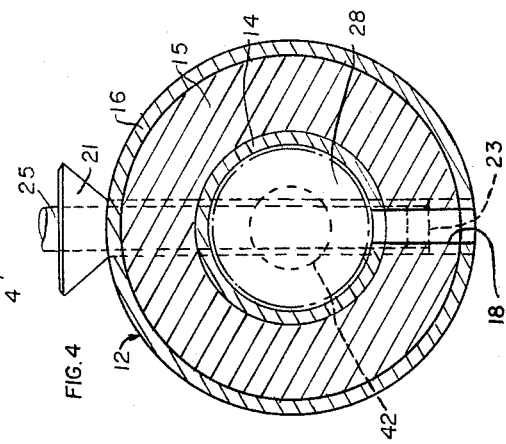

CONTROL CIRCUIT
100

INVENTORS.
HUGH F. STODDART
JAMES B. WILLIAMS
BY ROBERT HINDEL

Joseph G. Schwalbach
ATTY.

United States Patent Office 3,268,728
Patented August 23, 1966

3,268,728
APPARATUS AND METHOD FOR THE DETERMINATION OF FLUID VOLUME BY RADIOACTIVE DILUTION TECHNIQUES
Hugh F. Stoddart, Westport, Conn., James B. Williams, Lexington, Mass., and Robert Hindel, Hamden, Conn., assignors, by mesne assignments, to Miles Laboratories, Inc., Elkhart, Ind., a corporation of Indiana
Filed Mar. 3, 1964, Ser. No. 349,095
19 Claims. (Cl. 250—71.5)

This application is a continuation-in-part of our U.S. application Serial No. 61,431, filed October 10, 1960, now abandoned.

This invention relates to apparatus and methods for the determination of fluid volume by radioacitvity dilution techniques and is especially adapted for the measurement of circulating blood volume.

The use of radioactivity dilution techniques in the determination of blood volumes is well known. Briefly, the method is to tag a small amount of serum albumin, red cells or other constituent of the circulating blood with an accurately known quantity of radioacitve isotope. After this tagged material or dose has become well mixed with the total blood volume, a sample of the blood is withdrawn and the activity of a carefully measured volume is determined. The circulating blood volume can be calculated by the following relation:

$$V/v = q/a$$

where:
V is the unknown circulating volume
v is the volume of the sample measured
a is the activity of that sample
q is the total activity of isotope administered.

In practice this method has not heretofore been much used because of the complicated manipulations involved and the skilled personnel required. Thus, it has been first necessary to prepare an accurately known sterile dose suitable for injection, together with a comparison dose, both of which required the use of volumetric glassware, a precision laboratory scintillation counter and suitable radiation standards. Thereafter, the volume of the blood sample withdrawn after the dilution had taken place had to be accurately measured and its activity determined, also taking into account the comparison dose. In both, the background of the scintillation counter had to be subtracted and attention paid to the statistical errors introduced. As a result the doctor had to wait as long as a day for a blood volume measurement to be made, primarily because of the series of volumetric measurements including pipettings, and dilutions, hot source handling, and four scaler runs, including background plus calculations involving two subtractions and two multiplications. This usually required the minimum of two people with the measurements being made in a research lab. Results were hence not routinely available for hours after the determination and relatively highly trained specialists were required for the procedure. As a result, blood volume determinations have remained essentially as laboratory techniques and relatively little clinical use has been made of this procedure among surgeons and general clinical practitioners although its desirability in many situations has been well understood.

It is therefore an object of the present invention to provide novel apparatus and methods for the determination of blood volume within minutes so that it is thereby made practical in surgical as well as general clinical practice.

It is a particular feature of the invention that a direct blood volume measurement may be read on an appropriate instrument without volumetric pipettings, computations or the use of specially trained personnel.

It is another feature of the invention that widely varying activity rates such as of the dose and sample may be effectively compared.

It is another feature of the invention that means are provided for detecting too strong or too weak doses.

It is another feature of the apparatus of the invention that with the preferred embodiment thereof limits of accuracy of better than five percent are maintained even after several determinations.

It is still another feature of the invention that more than one radioactive isotope may be used without the necessity of adjusting the apparatus of the invention.

It is another object of the invention to provide methods and apparatus for the determination of the age of biological fluids, such as serum albumin.

In a preferred embodiment of the invention the novel steps performed in providing a blood volume test with the novel apparatus are briefly as follows:

(1) After energization of the apparatus, the control knob is turned to its reset position, which is the first of four positions. All circuits are automatically reset and an instruction plate is illuminated which reads "Place Dose In Center Well." The term "'dose" as used herein refers to a carefully measured quantity of a substance such as radioactive serum albumin, packaged in a suitable container. A sterile disposable dose syringe is recommended. The "center well" or "dose well" is one of three wells on the apparatus, each of which is appropriately identified.

(2) The package containing the dose is placed in the center well of the apparatus marked "Dose" and the control knob is turned to the second position marked "Measure Dose." The apparatus measures the counting rate of the dose (including instrument background counting rate) and stores the value in an associated memory $(D_t + Bkgd)$.

After storage of the count in the memory, a second light directs the attendant to withdraw a blood sample from the person under test prior to insertion of the dose. The withdrawn sample is identified hereinafter as the "pre-mix" sample. The same instructions also state "inject the dose, and return dose package as emptied to the dose well on the apparatus."

(3) The control knob is advanced to the third position, or the "Subtract Residue" position. The apparatus automatically determines the counting rate of the residue in the emptied dose package in the well plus instrument background counting rate $(D_r + Bkgd)$, and subtracts the value of such counting rate from the stored count of the dose $(D_t + Bkgd)$.

The apparatus now energizes a third light which instructs the attendant to "discard dose package, insert pre-mix and post-mix samples in end wells." The term "post-mix" as used herein refers to a blood sample which is withdrawn after a time period sufficient to permit circulation of the dose in the person under test.

(4) With the post-mix sample in one end well and the pre-mix sample in the other end well (the dose well is between the two end wells and not in use at this time), the control knob is moved to the fourth position "Compute Volume." The apparatus automatically determines the difference between the counting rates of the pre-mix sample plus background and post-mix sample plus background $$(S_{post} + Bkgd) - (S_{pre} + Bkgd)$$

and computes the volume according to the formula $$\text{Blood Volume} = \frac{(D_t + B) - (D_r + B)}{(S_{post} + B) - (S_{pre} + B)} \cdot V_s$$

wherein $V_s$ is the effective volume of the withdrawn samples.

An important step in this novel method is the step of measuring the value of radioactivity of a known volume of a test sample (the post-mix sample) and during the same time period subtracting therefrom the value of radioactivity of an equivalent volume of an unmixed sample (the pre-mix sample) to provide a corrected test sample activity (the net sample activity), the measuring of the corrected test sample value being continued for a period of time sufficient for the activity of such net sample in terms of pulse counts to equal the total counts of radioactivity of the dose added to the volume of fluid to be determined. Under these circumstances, the ratio of the time during which the dose activity is measured to the time during which the sample activity is measured, is proportional to the ratio of the unknown volume to the known sample volume. Thus, an indicating device responsive to the sample measuring time can be made to indicate directly in volume.

Another novel step according to the invention resides in the step of successively measuring dose activity and sample activity so as to provide counting rates of the same order of magnitude by spacing the dose at a suitably greater distance from the radiation sensitive detector means than that of the sample and/or by placing filter or other suitable means between the dose and the detector means.

Still another novel step according to the invention resides in the step of simultaneously counting the dose by a pair of spaced radiation sensitive detector means with the dose positioned therebetween substantially to reduce the effects of errors in dose positioning. Furthermore, if desired, a corrected value of dose radioactivity can be provided according to the method of the invention by subtracting a residual dose activity value from the gross value of dose activity, with the net dose activity being measured subsequently to and in a manner identical to that of the gross dose activity. This is especially useful in determining the residual activity of a dose container such as a syringe, after the dose has been injected for human blood volume determinations, as in no other way can the net dose be accurately determined. This latter step is also valuable in that it automatically corrects for the natural detector background, so that the step should be carried out even if there be no actual dose residue.

In order to make possible the carrying out of these novel steps according to the method of the invention, including the measurement of gross and residual dose activity by a pair of simultaneously operating radiation sensitive detector means, the filtering of the radiation from the dose and/or the spacing of the dose and samples to provide counting rates of the same order, and the measurement of radioactivity of two samples during the same time period, apparatus is provided according to the invention including a radiation shielding housing wherein may be mounted in spaced relationship suitable radiation sensitive detector means together with means for positioning two radioactive samples within the housing adjacent the radiation sensitive detector means and for positioning a radioactive dose between the two radiation sensitive detector means. Means are further provided for viewing a predetermined volume of fluid sample to be measured by positioning a volume of said fluid across the housing so that separate measurement of said volume is not necessary. While in general, the radiation sensitive detector means may take a number of forms, in the illustrated embodiment of the invention they each comprise scintillation means mounted within the housing adjacent the means for positioning the samples and photosensitive means mounted adjacent said scintillation means for viewing the latter and for generating output signals, i.e. pulses, responsive to scintillations produced in said scintillation means.

In combination with such structural means for making possible the counting during a given time period either of two samples or of a single dose, electronic means are provided connected to the photosensitive means. Such electronic means includes storage means for storing pulses received from both of the photosensitive means, as during dose counting, corresponding to dose activity counted over a predetermined period of time, as well as means for subtracting subsequent pulse information, as received from a residual dose count, from the stored counts. This means thus includes, preferably, means for adding together during one time period values measured at each of the photosensitive means, or alternatively, during one time period adding a value measured at one of said photosensitive means and subtracting a value measured at the other of the photosensitive means to the pulses stored in the storage means to reduce the total of the stored pulses to zero, together with means responsive to the "zero" condition of the storage means to provide a "zero count" signal at the end of a count-down. Timing means are also provided for establishing the interval during which such dose pulses are stored and then subtracted to provide a net dose counting rate. The electronic means also includes indicator means, operative during a sample count while counting down the pulse information in the storage means to zero by means subtracting the post-mix sample count and during the same time period adding the pre-mix sample count, thus to provide a direct indication of the fluid volume to be determined. Also, the electronic means may be arranged to provide indications of "too strong" and "too weak" doses, the latter being as well an indication of "too old" biological injection fluid.

More specifically, as a portion of its electronic means, the invention preferably provides a novel reversible storage scaler for performing these storage, adder and subtractor and "zero" signal functions, as well as providing "too strong" and "too old" signals.

Another aspect of the invention, then, provides novel methods and apparatus for determining the elapsed time from tagging or the age of a substance, for example of a biological fluid, by tagging the substance, i.e., adding a known amount of radioactive isotope to a predetermined quantity of the substance, in the case of a biological fluid the age of which is to be determined soon after its preparation, and thereafter, at an unknown time after tagging, measuring the radioactivity of the substance to determine the elapsed time from tagging by comparison of the measured radioactivity with the known original radioactivity, the rate of decay of which is known.

For the purposes of explaining further objects and features of the methods and apparatus of the invention, reference is now made to the following drawings, wherein:

FIGURE 1 is a diagrammatic view partially in block diagram form of a preferred embodiment of the apparatus of the invention;

FIGURE 2 is a graph showing the operation of the apparatus of FIGURE 1;

FIGURES 3–5 are cross-sectional views of the major structural elements of the invention.

Figure 6:
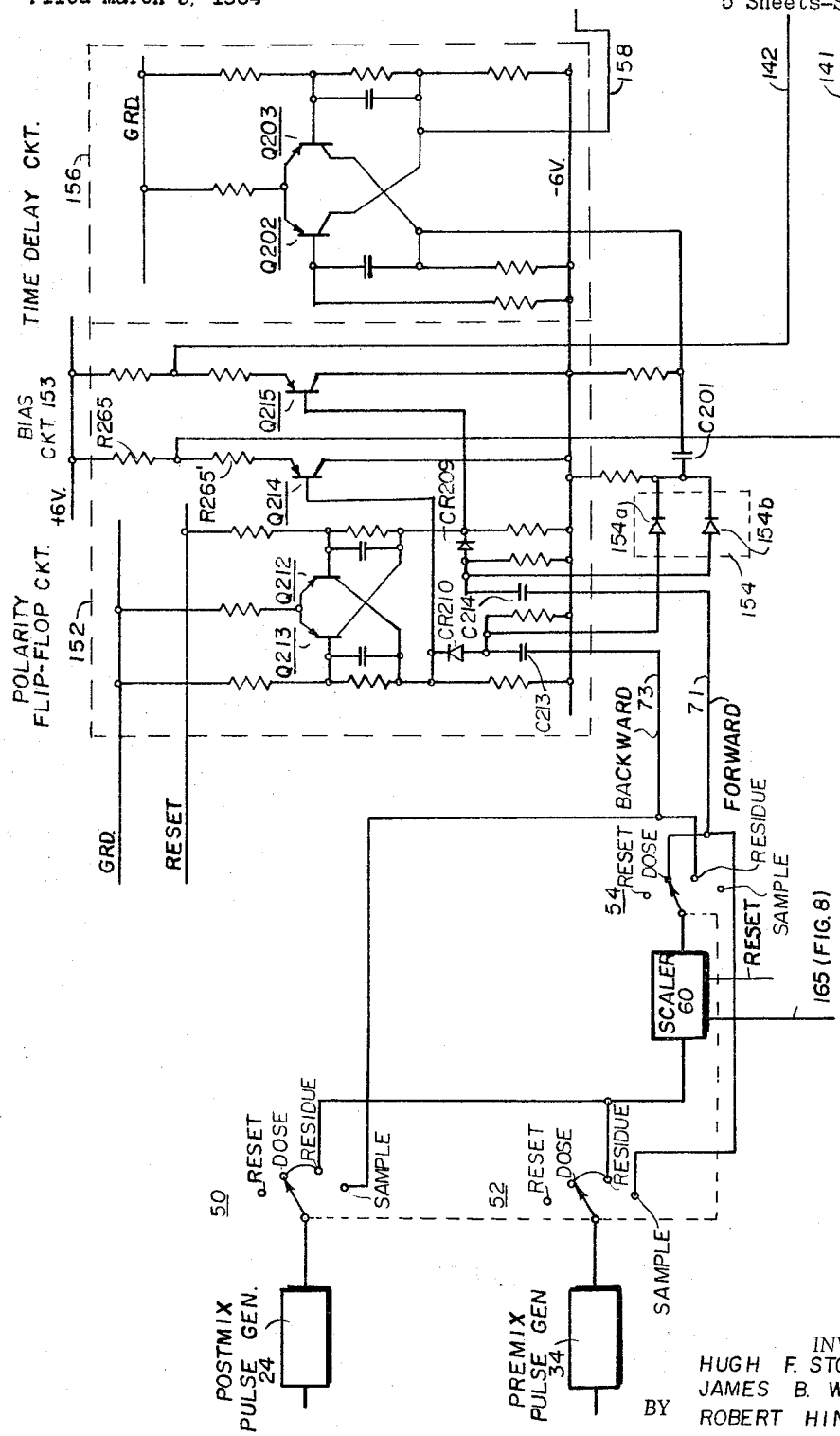
FIGURES 6–8 are detailed circuit diagrams of certain elements of the blocks of FIGURE 1 including the circuit of the novel reversible storage scaler of the invention.

Referring first to the drawings and particularly to FIGURE 1 thereof, the apparatus of the invention in general includes a structural assembly for mounting the doses and samples for counting by a pair of detectors, together with appropriate circuitry for adding, subtracting and storing the counting pulses and timing and indicating the counting intervals as well as providing "too strong" and "too old" signals, in accordance with the principles of the invention.

The novel structural elements of the form of the invention shown in FIGURE 1 include a cylindrical lead radiation shielded tubular housing, generally designated 12, defining a cross-sectional viewing area within the radiation shielded housing, within which area a radiation source may be viewed to the exclusion of radiation sources radially outwardly of said cross-sectional area. The housing has viewing openings at its ends within which may be positioned suitable photomultiplier tubes 22, 32 for viewing the interior of the housing in opposite axial directions toward one another. The tubes are connected to suitable amplifier pulse generator and scaler elements 24, 34, respectively, for converting light impulses received by said tubes to a pulse output for storage and otherwise. The housing 12 is provided with three transverse openings along its length, a central opening 40 extending vertically across the interior cross section of the housing tube at its transverse center line and two off-center openings 26, 36 also extending vertically across the interior cross section of the housing 12 between the central opening 40 and the end of the housing, the off-center openings 26, 36, being surrounded by scintillators 28, 38 which extend entirely across and throughout the viewed cross-sectional area of the radiation shielded cross-sectional area of the housing. Each of the these openings may have tubular elements extending therethrough for supporting radioactive materials contained in suitable receptacles such as test tubes or the like, and filters and the like elements may be provided within the housing 12 for modifying the radiation patterns and intensity, such including preferably filters 44 adjacent the scintillators 28 and 38, each with a disc-like element 42 positioned concentric to said filters adjacent the inner faces thereof for modifying the dose radiation pattern for improved dose position independence. By means of such radiation modifying elements, more than one radioactive isotope may be used without readjustment of the apparatus. The scintillators may be of any suitable material known to the art and preferably surround the off-center openings 26, 36, such scintillators having flat ends and being of cylindrical cross section with an opening extending vertically across their diameter for receiving the sample-containing means.

With such an arrangement, both photosensitive tubes count the scintillations produced by a dose mounted in the central opening, or during the same time period count pre-mix and post-mix samples mounted in the off-center openings, each photosensitive tube counting only the scintillations from its adjacent scintillator.

Figure 8:
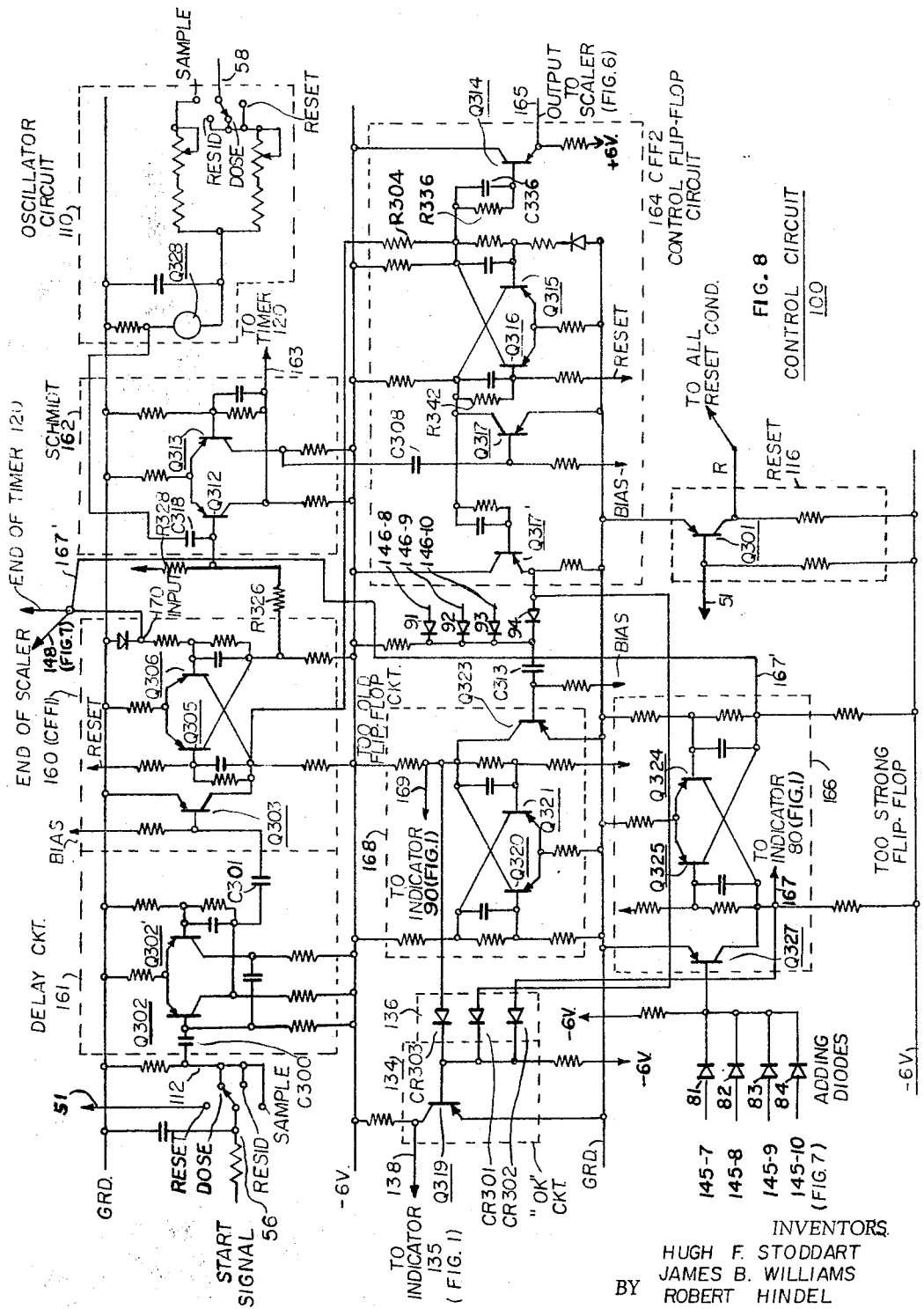

As indicated above, a single control knob on the instrument is adjustable to four different positions (Reset position, Dose position, Residue position, and Sample position), and in its operation controls the setting of a plurality of switches, such as 50, 52, 54, 56 (FIGURE 1) and 58 (FIGURE 8). More specifically, the outputs of each of the photomultiplier amplifier pulse generators and scalers 24, 34 are fed alternatively by means of switches, 50, 52, 54; in "dose" position, for dose counting through scaler 60 to the forward terminal 71 of reversible scaler 70; in "residue" position for residue counting through scaler 60 to the backward direction terminal 73 of reversible scaler 70; or in "sample" position for simultaneous sample counting to both forward and backward terminals of reversible scaler 70 with the pre-mix sample elements connected to the forward terminal thereof and the post-mix sample elements connected to the backward terminal thereof. A "reset" position is also provided. As will be hereinafter more fully described, reversible scaler 70 is enabled to store counts, and to add to or subtract from the counts stored therein by pulses applied to appropriate terminals thereof, as well as to provide outputs indicating a "zero count" stored therein following a count-down as well as for other purposes. Somewhat more specifically, three outputs are provided from said reversible scaler to the control circuit block 100, one being the "too strong" signal for indicator 80, another being the "too old" signal for indicator 90 and the most important being the scaler "zero count" signal upon scaler 70 reaching a "zero count" after count-down.

For establishing a preset time of operation for storage of the dose and residue pulses and for timing the counting of the pre-mix sample minus the post-mix sample to subtract them from the net dose count stored in reversible scaler 70, timing means are provided including an oscillator 110 connected through control circuits 100, to a timer 120 having a digital analog converter 125 in turn connected thereto for operating an indicating meter 130. Control circuit 100 also is connected to the photomultiplier tube amplifiers 24, 34 so that they will begin operation to produce pulses when the control circuits are actuated by switch 56 to feed output pulses therefrom through switches 50, 52, 54 to the reversible scaler 70. In addition, the control circuit block 100 also is connected to the "OK," "too strong" and "too old" indicators 135, 80 and 90 respectively.

Briefly, the operation of the above described apparatus in carrying out a human blood volume determination according to the method of the invention proceeds as follows, the counting sequence being graphically shown in FIGURE 2:

The dose of biological fluid, such as serum albumin containing a radioactive isotope with a known original activity, contained in a suitable syringe is first inserted into the central opening 40 and the single control knob which preferably operates all of the switches 50, 52, 54, 56 (FIGURE 1), 58 (FIGURE 8) is advanced from the first or "reset" position to the second or "dose" position. In doing so, the reversible scaler 70 begins to receive pulses in its forward direction through scaler 60. Pulses received by the two photomultipliers 22, 32 are added in this mode of operation and are stored in reversible scaler 70. While the dose counting is on, a pre-mix blood sample can be withdrawn from a patient. It is transferred into a sample tube which is put aside until needed later. After a predetermined period of time, say one minute, the counting of the dose is stopped by timer 120. At this stage, one of three possible situations may exist:

(a) The dose strength is acceptable as indicated by the "OK" indicator 135. The operator can then proceed to the next step;

(b) The dose is too old as indicated by the "too old" indicator 90 and the operator has to exchange the dose for a fresher one;

(c) The dose is too strong as indicated by the "too strong" indicator 80 and the operator has to exchange the dose for a weaker one.

Assuming the dose is correct, the dose container may then be removed from the central opening 40 and the dose injected intravenously in the patient. Before removing the post-mix sample from the patient, however, five to ten minutes must elapse for proper mixing. During this time, the dose residue can be counted by inserting the dose syringe again in the central opening 40 and advancing the control knob to the third switch step "residue." In this position, pulses from both photomultiplier tubes are subtracted from the total of the dose pulses stored in reversible scaler 70, over the same predetermined time as the dose pulses were counted, to give a corrected net dose pulse total. This can be seen graphically in FIGURE 2.

After waiting about five to ten minutes after injection of the dose, a post-mix blood sample is withdrawn and transferred to a sample tube. The blood sample in its tube is then put into the post-mix sample opening 26 and the pre-mix sample in a similar tube earlier collected is put into the pre-mix sample opening 36. The control knob is advanced to its fourth or "sample" position to start the counting down of both of the samples during the same time period, with the more highly active post-mix sample having its counts subtracted from those stored in the reversible scaler 70 and the weaker pre-mix sample having its counts added to those stored in the reversible scaler 70. At the moment when the counts stored become zero, the counting operation is automatically terminated. The meter needle of indicator 130 will then indicate the blood volume directly. This is shown graphically in FIGURE 2, wherein the relative time relationships are proportional to the ratio of dose to sample activity. It should be noted, however, that the ratio of times would be substantially larger than shown in FIGURE 2, such being intended only as a convenient illustration to show the principles involved.

In FIGURES 3, 4 and 5 are shown in greater detail the novel structural aspects of the apparatus of the invention. Thus, the tubular housing generally designated 12 comprises a pair of spaced cylindrical tubes, inner tube 14 and outer tube 16, with the space therebetween filled by a material, such as lead 15, to reduce the radiation from the interior of the structure as well as to define a cylindrical radiation shield. An end plug 17 also of lead is provided for the inner tube and a slot 18 is provided in the assembly at the end thereof for the purpose of providing a passageway through which wires from the photosensitive tube 22 within the inner tube 14 may be passed. As is also shown in FIGURE 1, the housing 12 is provided with a vertical central opening generally designated 40 and a pair of similar off-center openings generally designated 26 and 36; the former only of such being shown in FIGURES 3 through 5 since but one-half of the total assembly need be shown, the other half being identical about the transverse center line which lies along the axis of central opening 40.

The central opening 40 includes a bore 41 through the lower wall of said tube and a pair of concentric bores 43 and 45 through the upper wall of said tube, the uppermost of said concentric bores 45 being larger than the lower to provide an annular surface 49 therebetween. Filters 44 are mounted within the inner tube 14 at the inner faces of scintillators 28, 38, and each has a disclike element 42 concentric with the axis of tube 14. Said element extends throughout a limited but substantial portion of the cross section of the tube and has a sloped outer edge for the purpose of controlling the strongest central field of radiation from a container positioned generally centrally of the opening 40, such being important because of its ability to aid in controlling the necessary geometry of the structure for producing more uniform counting outputs from materials of different radioactivity, as well as for enabling the geometrical relationships between the central opening 40 and the off-center openings 26 and 36 to be more easily determined. The annular surface 49 at the bottom of the large upper bore 45 is arranged to support a tubular plastic member 47 having an out-turned annular flange at its upper end and an in-turned annular flange at its lower end. The member 47 supports a conventional plastic syringe 46 so that the dose of radioactive material in serum albumin 48 contained therein will be supported generally centrally of the tube and of element 42. Such syringes in themselves are well known in the art, consisting of a plastic cylinder and piston with a hypodermic needle mounted at the end thereof, and need not herein be further described.

Each of the off-center openings 26 and 36 includes a vertical bore 27 extending through both walls of the housing 12, such bore being of a diameter to receive therein a metal tube 21 having a flared upper end for supporting it in the bore. Such tube has a rubber plug 23 in its opposite end for removably supporting therein a cylindrical glass tube receptacle 25 for supporting therein a sample 29 of the material, the activity of which is to be measured, such as human blood, for example. A conventional scintillator crystal 28 surrounds the metal tube 21, such crystal, as shown in the drawings, having flat ends and being of cylindrical cross section with a through bore for receiving the tube 21, which also serves to hold it in position within the housing. Such crystals may be made of any suitable material, for example, such as NaI and, being well known in the art, need not be further described herein.

In accordance with the principles of the invention, it is important that a specific volume of the sample to be counted, both the pre-mix and the post-mix sample, be accurately known. This is accomplished in a unique manner in the present structure by providing sample positioning means in the form of a sample-containing receptacle 25 and means for positioning said receptacle in a fixed predetermined operative position wherein it has a fixed predetermined volume exposed within the viewing area generally defined by the bore of the inner tube 14, and with at least a portion of the interior of said receptacle extending beyond the margin of the viewing area. The illustrated receptacle 25 takes the form of a tube which extends transversely entirely across the viewing area with the open end thereof extending above the margin of the viewing area and the closed end thereof extending below margin of the viewing area, so that a sample contained in the tube 25 can extend both below and above the bore of the inner tube 14. The illustrated tube 25 is of relatively small diameter, for example of a diameter 10 to 30 percent of that of the tube 14.

A sample 29 contained in the tube 25 is supported in columnar form, and when said tube is in said operative position, diametrically opposite marginal portions of the bore of the tube 14 define a predetermined fixed volume of sample within the viewing area. Thus it is simply necessary to put a sample to be tested into the receptacle 25 in sufficient quantity to at least fill the portion of the receptacle exposed within the viewing area when the receptacle is in said operative position. So long as this minimum quantity of sample is placed in the receptacle, the same identical volume is exposed within the viewing area when the same receptacle or an identical receptacle containing a successive sample is placed in said operative position. This is important to the operation of the apparatus of the invention since by utilizing such identical receptacles in the described housing structure, the necessary volumetric measure of sample is simply and automatically achieved.

Unlike the sample volume 29, the volume of the dose 48 is not important. However, it is necessary that its total activity be measured. To this end, the structure of the invention automatically provides that a conventional syringe will be suspended centrally of the tube for viewing of its radioactive contents as modified by the disc 42 and the radiation reducing filter 44 which may be of lead or copper, for example. This latter filter makes possible the use of a shorter tubular housing than would otherwise be the case, since by reducing the amount of radiation from the highly active sample 48, it may be placed closer to the crystals 28, 38 to reduce the overall length of the housing. It also more readily enables the use of a variety of radioactive isotopes without the necessity of adjustment to the machine.

The photosensitive tubes 22, 32 are arranged within the ends of the housing with their faces close to their cooperating crystal, as shown in FIGURES 3 and 5 in regard to tube 22 and crystal 28. Photomultiplier tubes of conventional type are utilized together with their known circuitry and hence need not be further described herein.

The above described structure may be supported in any suitable manner with its three upper openings arranged therealong for the convenient insertion and removal of samples, while the suitable electronic components may be mounted in any convenient manner therebelow. However, it should be noted in connection with FIGURES 3 and 5 that the apparatus is never used with both the dose container and the sample container simultaneously in place, such being shown in these drawings merely for illustrative purposes.

Figure 7:
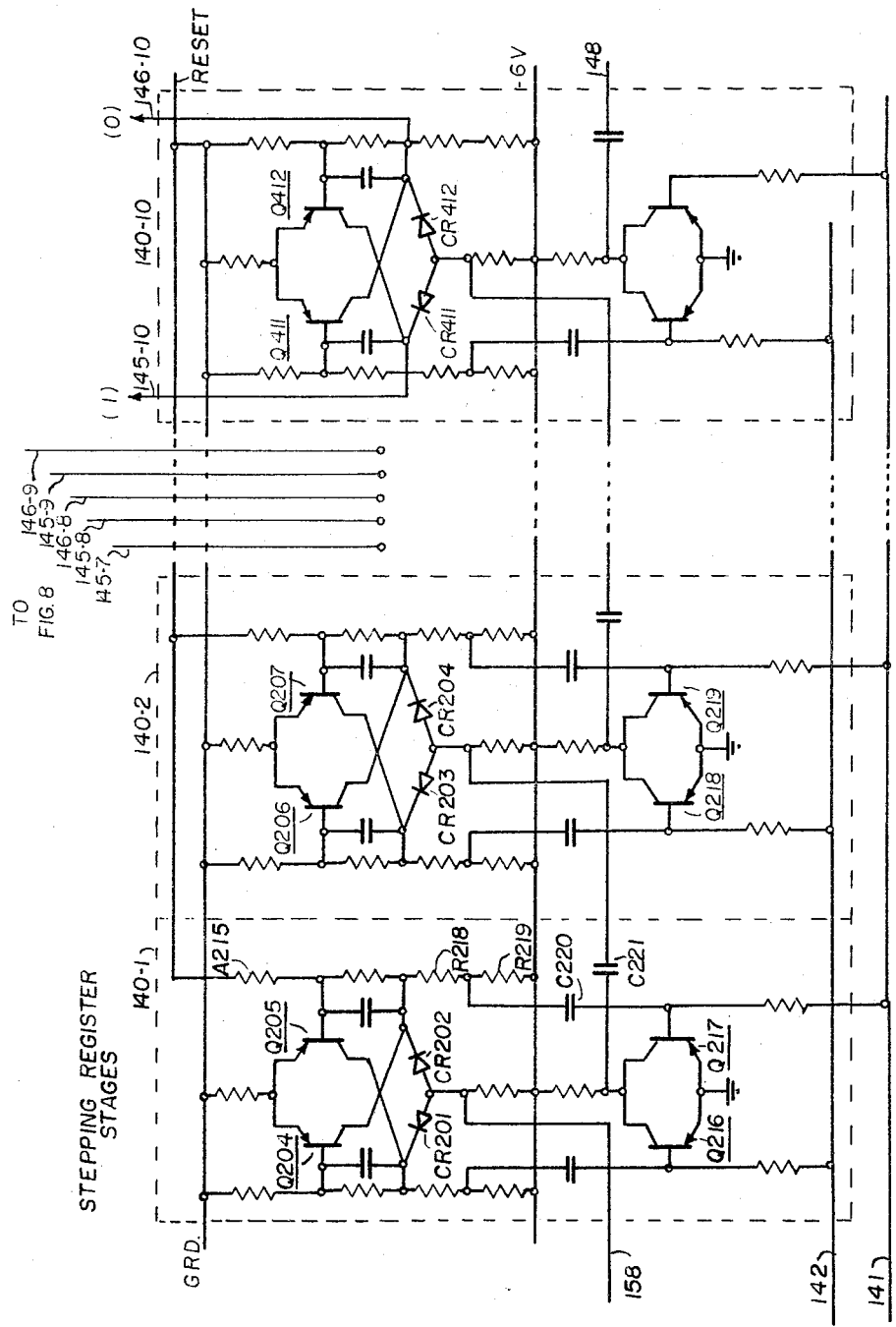

The specific circuitry of the block diagram elements shown in FIGURE 1 is set out in FIGURES 6–8, FIGURES 6 and 7 showing the novel reversible scaler of the invention and FIGURE 8 the control circuit for operating the apparatus. Certain of the elements are not shown in specific detail being well known in the art and used in a conventional manner. Of these, for example, the photomultiplier tubes and their associated pulse generators operable by an input signal to produce output pulses at switches 50, 52 are well known and need not be described in detail, nor need such conventional elements as the oscillator 110 and the timer 120, the latter being a conventional scaler which operates any suitable digital to analog converter which in turn provides a suitable voltage output for operating meter 130.

Turning to FIGURES 6 and 7, the reversible scaler of the invention as shown specifically herein includes ten stepping register stages each including a memory circuit and a steering circuit of which stages 1, 2 and 10 are shown, the omitted stages being the same as stage 2 (except for an additional feature hereinafter set forth), such stages being enclosed within dotted blocks and being numbered 140–1, 140–2, and 140–10 respectively. The memory element of each of the stages is generally conventional and hence need not be described in detail herein, being specifically shown in the drawing. The steering circuit as shown comprises two "and" gates and one "or" gate operative upon an appropriate input signal to select the appropriate output from its associated memory circuit and steer it to the succeeding memory circuit. In addition to the usual power and ground lines for each of the stages as well as a reset line, according to the invention, there is also provided the forward stepping line 141 and a backward stepping line 142, which is common to all of the stages as well as an input line 153 that feeds the first stage 140–1 for counting. The last four stages have special output lines 145–7, 145–8, 145–9, 145–10 for operating the "too strong" indicator 80 and the last three stages have special output lines 146–8, 146–9, 146–10 for operating the "too old" generator 90, while the output line 148 of the final stage 140–10 is connected to the control circuit 100 to indicate the reaching of a "zero count" in scaler 70 upon a count-down of pre-mix minus post-mix sample pulses.

Associated with the stages 140–1 through 140–10 is a polarity flip-flop circuit 152, as shown in FIGURE 6, the purpose of which is to energize selectively backward or forward lines 141, 142 depending upon whether there is an input to forward terminal 71 of scaler 70 or to backward terminal 73 of scaler 70.

In addition to the utilization of input pulses to step the scaler either backward or forward for adding or subtracting depending upon the source of such pulses, the backward and forward pulses are also added irrespective of their source by a diode circuit 154 so that they can be utilized as counting pulses regardless of the direction in which the scaler is being set by the backward or forward lines 141 or 142. This is accomplished by feeding the common input from adding diode circuit 154 to a delay univibrator circuit 156, the output of which is connected to the input 158 of the first register section 140–1, so that said sections operate a succeeding stage for counting.

As mentioned above, the last four stages of the scaler 70 are also utilized to provide outputs for operating the "too strong" and "too old" generators 80 and 90. Thus, the "too strong" indicator 80 is operated upon the occurrence of a "1" signal in each of the last four stages from their outputs 145 (7 to 10) through adding diodes 81, 82, 83 and 84 (FIGURE 8) connected thereto. The "too old" indicator 90 is operated by the occurrence of a "0" condition of each of the three last stages from their outputs 146 (8 to 10) by diodes 91, 92 and 93 (FIGURE 8) connected thereto, in conjunction with a signal from control flip-flop 164.

The control circuit of the apparatus of the invention is shown in FIGURE 8, its input 112 being connected to the "dose," "residue" and "sample" terminals of switch 56.

It includes a control flip-flop circuit 160 connected to its input through a suitable delay circuit 161, the control flip-flop operating gate circuit 162 for connecting oscillator 110 to timer 120 through line 163, as well as providing an output to a second control flip-flop 164 having an output terminal 165 to control gating of the output of the photomultiplier tube pulse generators 24, 34 to the scaler 60 (FIGURE 6). Oscillator 110 is switched by switch 58 to provide two frequencies, the lower one of which is used during sample counting, extending the sample counting time relatively to the dose counting time. Means are also provided for cutting off the operation of control flip-flops 160 and 164 upon the occurrence of a variety of events, specifically, a "scaler zero" signal from the scaler output 148 at terminal 170, a signal from the timer 120 also at said terminal 170, or a signal from the "too strong" flip-flop 166 at its terminal 167 which also serves to operate the "too strong" indicator 80. The occurrence of any one of such signals is applied to each of the control flip-flops 160, 164 to reset them. If at the end of the dose counting time, diodes 91, 92 and 93 receive "0" signals from the scaler 70, then "too old" flip-flop 168 is set through diode 94. A signal at its terminal 169 then operates "too weak" indicator 90. If the dose is neither "too strong" nor "too old," then at the end of the dose counting time the diode "and" circuit 136 energizes amplifier 134 which through its output terminal 138 operates "OK" indicator 135. A reset amplifier 116 is employed and is connected to the "reset" terminal of switch 56 to provide a reset pulse which is transmitted over each of the reset conductors in the system (see FIGURES 6, 7, 8, for example) to reset the various elements through the circuitry shown.

As for the elements not specifically shown in the drawings, the pulse generators 24, 34 (FIGURE 6) preferably include scalers of a conventional type in scale of sixteen with an appropriate gate for turning the scaler on and off by a signal from control circuit terminal 165 so that its pulse output may be controlled over a predetermined time established by the timer 120. Such scalers and gates are shown as elements of the bi-directional scaler and control circuits herein, and are used in an entirely conventional manner in the pulse generators 24, 34 and hence need not be specifically shown. The scaler 60 is simply a conventional scaler, also shown herein as elements of other circuits, and also need not be described. Timer 120, as noted above, is also a conventional scaler with its outputs combined, for example, by an adder circuit to provide a current output connected to a conventional meter 130 so that the meter will be advanced as the counts accumulate.

In one embodiment, the timer 120 and oscillator 110 were operative to provide a measured time of approximately forty-one seconds for dose measurement, and a measured period of approximately ten times this number for the sample time. The timer 120 included a scale having eight scaling bits driven by the slow speed oscillator 110, the oscillator in the first three positions of the control knob being set to run at a speed of one pulse every 160 msec. so that the output after eight scaling bits will occur at $160 \times 256 \times 10^{-3}$, or approximately forty-one seconds after energization. In the "measure volume" position (the fourth position) of the control knob an additional scale of eight is inserted before the timer input, and the speed of the oscillator 110 is adjusted to a slower speed by insertion of an additional resistance in the control circuit therefor (FIGURE 8).

The digital output provided by the eight scaling bits of the timer 120 is converted to an analog indication on a meter by a conventional adder circuit. That is, each of the flip-flops in the eight stages has an associated amplifier which provides an output of alternatively −50 volts (the off condition) or zero volts (in the saturated condition). The output indications of the eight bits are used to produce currents at each of eight nodes of the adder resistance network which sums the currents at the end of the string so that the total current is an analog indication of the digital set of the eight bits. The final current is applied to a meter, and readout of the blood volume is provided directly in a numerical or analog mode.

The specific structure and circuit elements of the apparatus of the invention now having been described in detail, its operation and the significance of certain of the elements can be explained more precisely than was the case in the brief description of the operation as above set forth.

STEP 1.—OPERATION OF CONTROL KNOB TO "RESET" POSITION

As a first step in carrying out the method of the invention the control knob is operated to the first or reset condition, and the system is automatically reset. As the control knob is operated to such position, switch 56 (FIGURE 8) closes, and the voltage at the base of transistor Q301 changes to approximately +1 volt to effect transistor cutoff. The collector voltage goes negative to provide a negative pulse over conductor R which constitutes the reset pulse for the system.

By way of brief example, the reset conductor R is connected over resistor R215 to the right hand section of each of the flip-flops 140-1, etc. (FIGURE 7), in the reversible scaler 70 and with the application of a negative pulse over the reset conductor, the right hand transistor of each stage, such as Q205 in stage 140-1, conducts and the left hand transistor, such as Q204, is cut off. The manner of reset of the other circuitry in the apparatus connected to the reset conductor "R" including flip-flop 160, 164' (FIGURE 8) will be apparent therefrom.

With the circuitry of the invention set to its "reset" condition and the switches 50, 51, 52, 54, 56, and 58 in their "reset" position, the dose sample contained in a sealed container, such as syringe 46, is inserted into central opening 40 of housing 12 as is shown in FIGURES 3 and 5, neither of the pre-mix or post-mix samples being present in the housing at this stage of operation.

STEP 2.—OPERATION OF CONTROL KNOB TO "MEASURE DOSE" POSITION

Switches 50, 52, 54, 56 and 58 (FIGURE 8) are then advanced to the measure dose position and the radioactivity of the dose will impinge upon crystals 28 and 38 causing scintillations which are sensed by the photomultiplier tubes 22, 32 to produce pulses from their cooperating pulse generators 24, 34, which have been turned on by control circuit 100 by the moving of the switches to the "dose" position. With the output switches 50, 52 of pulse generators 24, 34 in the "dose" position (FIGURE 6), the pulse output from the photomultipliers is added together, its value being appropriately reduced by a factor of 64 by scaler 60, and the resulting counts therefrom are applied to the forward terminal 71 of reversible scaler 70.

Since, under these conditions, only forward pulses are being fed into scaler 70, its polarity flip-flop 152 will cause only forward line 141 to be energized so that the scaler will step forward while the pulses are counted as they appear at input 153. At the same time the control circuit initiated operation of the photomultiplier pulse generators 24, 34, it also initiated driving of timer 120 by the pulse output of oscillator 110. When the timer 120 times out at the end of its preset time for dose measurement, say forty-one seconds, it resets control circuit 160 by applying a pluse to input 170 thereof to cut off the coupling of signals from pulse generators 24, 34 to scaler 70 by a signal from terminal 165 so that pulses are no longer being fed to scaler 70. However, the pulses stored therein during dose counting are retained, since the scaler is not reset at this stage. More specifically, referring to FIGURE 8, with advancement of switch 56 to the dose position, an input potential is provided over switch 56 for the purpose of initiating the measurement of a predetermined time period for dose measurement and simultaneously determining the dose counting rate during such time period. The input potential is transmitted over the conductor for delay circuit 161 which, after a predetermined time delay, sets flip-flop CFF1 (160) which, in turn, enables Schmidt circuit 162 in the extension of pulses from the oscillator circuit 110 over output conductor 163 to the timer circuit 120.

More specifically, with the closure of the switch 56 as the result of moving the control knob to the "measure dose" position, a pulse is transmitted over capacitor C300 to the base of transistor Q302 of delay circuit 161 to turn transistor Q302 off and transistor Q302' on. After a brief predetermined time delay, the voltage at capacitor C301 changes in the negative direction from ground to −2 volts and transistor Q303 is momentarily pulsed to the conducting position which, in turn, pulls the control flip-flop 160 to the "set" condition (Q305 turned off; Q306 turned on). As a result, the voltage of the collector of Q305 goes in the negative direction to reduce the positive bias on the base of transistor Q312 and thereby effect conduction of transistor Q312, whereby the output pulses of the oscillator 110 are extended over transistor Q312 in the Schmidt circuit 162 and conductor 163 to timer 120.

In one embodiment the oscillator 110 comprised a unijunction device Q328 which continuously provides pulses at a rate of one pulse every 160 msec. in the first three positions of switch 58. The output pulses provided by the oscillator 110 are coupled over capacitor C318 to the left hand transistor Q312 of the Schmidt circuit 162. However, when the flip-flop CFF1 (160) is in the reset condition (i.e., before receipt of the start pulse), the left hand transistor Q305 is conducting, and the collector voltage is close to ground, whereby the bias provided for the Schmidt circuit 162 by resistors R326 and R328 is sufficiently positive to prevent the negative pulse output of the oscillator 110 from operating Schmidt circuit 162.

As the output pulses of the oscillator are extended over conductor 163, the timer proceeds to count the pulses in the known manner of a scaler, and as the count advances to 256 (approximately 41 seconds), an "end of timer" signal is returned over input terminal 170 to the control flip-flop 160 to reset the flip-flop CFF1 and once more effect cut-off of the Schmidt generator. As a result, the coupling of pulses from the time base generator to the timer 120 is also terminated.

The first output pulse from the Schmidt circuit 162 at the time of start of the dose time measurement also sets control flip-flop circuit CFF2 (164) which, in turn, effects gating of the output pulses of the pulse generators 24, 34 to the scalers 60, 70 which count the combined output of said pulse generators to determine the radioactivity or counting rate of the dose.

With the enablement of the Schmidt circuit 162, transistor Q313 is pulsed off and a negative pulse over capacitor C308 to the base of amplifier Q317 effects the coupling of an output pulse over RC network 342, 310 to the base of flip-flop transistor Q316 which is turned off thereby. The collector of transistor Q316 changes in the negative direction, and the negative pulse is coupled over RC network R336, C336 to the base of transistor Q314. As the base of Q314 becomes less positive, the emitter voltage becomes more negative, and the resultant pulse over the control conductor 165 to the scaler 60 enables a scaler gate therein to extend the pulse output of the pulse generators 24, 34 over switches 50, 52, respectively to the scaler 60 for counting purposes.

As noted above, the pulse generators 24, 34 comprise conventional pre-scalers which in the case of the dose and residue measurements have a pre-scale of 16 utilizing four sets of flip-flops (such as used in the Eccles- Jordan type vacuum tube circuits) connected in the conventional manner. The scaler 60 comprises a scale of four scalers which are reset along with the main memory 70 whenever a reset pulse is coupled over reset conductor R for the system in the manner set forth above. For the dose and residue measurements the per-scale is 64, while for the sample measurements the pre-scale is reduced to 16.

As shown in FIGURE 6, with the control knob in the dose position to output of the pulse generators 24, 34 is extended over switch 50, 52 to scaler 60, and the sum output of scaler 60 is extended over forward conductor 71 for counting by the reversible scaler 70, such pulse output being gated by scaler 60 for the period allotted by the timer 120 (approximately forty-one seconds in the present example).

The pulses on conductor 71 are transmitted over capacitor C214 to (a) the polarity flip-flop circuit 152, and (b) over the diode adder circuit 154 to the time delay multivibrator circuit 156 to the stepping register stages of reversible scaler 70. With the receipt of the first pulse over the forward conductor 71, capacitor C214 and diode CR209, transistor Q212 in the polarity flip-flop circuit 152 will turn off (if conducting), and transistor Q213 will turn on. If the transistor Q212 is already non-conducting, it will remain in such condition.

The voltage at the collector of transistor Q212 will be negative, and the base of transistor Q214 is likewise negative. With the voltage at the base of transistor Q214 negative, the emitter is also negative and via voltage divider R265, R265', a negative voltage appears on the forward bias line 141 which is a bias conductor for the stepping register stages 140-1, 140-10.

As noted above, the input pulse received over the forward conductor 71 was also transmitted over capacitor C214, and diode 154b of diode adder 154, and capacitor C201 to the time delay circuit 156 to turn off transistor Q202 and turn on transistor Q203, whereby a negative pulse at the collector of transistor Q202 is coupled over conductor 158, a differentiating circuit (not shown), and the steering diodes CR201, CR202, the positive-going trailing edge of the differentiating pulse being used to trigger the first scaling bit Q204, Q205. Bistable multivibrator circuits using positive pulse steering are well known in the art and are only briefly described hereat.

As the first pulse is coupled to the steering diodes CR201, CR202, with the scaler in the reset condition (Q205 conducting and Q204 off), the first pulse will cause the collector of transistor Q204 to change in the positive direction, but the transistor Q217 will not respond to this polarity signal. The collector of Q205 will, of course, change in the negative direction, and this change is applied to the base of Q216. However, the bias on the base of transistor Q216 is considerably positive (by reason of the voltage placed on the backward bias conductor 142 by transistor Q215 in its turned off condition), and the pulse output of the transistor Q205 is insufficient to overcome this bias. As the next pulse is transmitted over conductor 71, the time delay circuit 156 and conductor 158, transistor Q204 is biassed off in accordance with well known steering techniques and a negative-going pulse appears at the collector of transistor Q204 which is divided by R218 and R219, and coupled over capacitor C220 to the base of transistor Q217.

It will be recalled that the incoming pulses during the dose measurement period are received over the forward conductor 71 and that the polarity circuit 152 responsively energized the forward bias transistor Q214 to change the forward bias conductor 141 in the negative direction. In that the same pulse is extended to the stepping register stage 140-1 by way of the delay circuit 156, the polarity circuit 152 will have sufficient time to provide the bias on forward conductor 141 to insure operation of the register in a forward direction by such pulse. Thus, by the time the negative pulse is received from the scaling bit 140-1 over capacitor C220, transistor Q217 has been biassed by the potential on conductor 141 and is accordingly turned on for the duration of the pulse. The pulse which thereupon occurs at the collector of transistor Q217 is extended over capacitor C221 to the steering diodes CR203, CR204 in the second scaling bit 140-2. This is referred to as a forward carry pulse. It will be seen from the foregoing description that two pulses in succession are necessary to obtain forward carry if the scaler is in the reset condition.

The scaler advances in its count in accordance with well known counter techniques to provide a binary count representative of the number of pulses received over the forward conductor 71 from the pulse generators 24, 34.

As the timer 120 completes its measurement of the predetermined time period of 256 counts of the pulses of oscillator 110 (approximately 41 seconds), the scaling bits of the timer 120 provide an "end of timer" signal over input circuit 170 to the control flip-flop 160 (CFF1) to pull the flip-flop into the reset state (transistor Q305 conducting, transistor Q306 off).

As a result, a positive signal over the collector of transistor Q305 increases the bias for transistor Q312 in the Schmidt circuit, and termination of the transmission of pulses over conductor 163 to the timer 120. At the same time, a negative signal from the collector of transistor Q306 is extended over resistor R304 to turn off transistor Q315 and to effect conduction of transistor Q316 and thus reset of flip-flop CFF2. The positive signal output of transistor Q314 over conductor 165 closes the scaler gate to terminate transmission of the pulses over the forward conductor of the reversible scaler 70, and thereby the end of the dose measurement count.

For the operation to proceed, however, the condition of scaler 70 must be such that the number of counts stored therein are not high enough to cause the operation of "too strong" indicator 80 and are not low enough to cause the operation of "too old" indicator 90, the operation of the latter being controlled so that it cannot be energized until after the timer 120 times out.

In the event that the dose is too strong, the count will be sufficiently high to change the state of the last four bits (i.e., the left hand transistor of the last four bits, such as transistor Q411 in the last stage 140-10 being turned on and Q412 being turned off). A negative signal will therefore appear on conductors 145-7, 145-8, 145-9, 145-10 (FIGURE 7) and the adding diodes 81-84 (FIGURE 8) connected to the "too strong" flip-flop circuit 166 will turn off. The current through the normally conducting diodes is thereupon reduced, and as the last of the four diodes is turned off, the voltage at the base of transistor Q327 changes negative sufficiently to effect momentary conduction of transistor Q327 and operate the "too strong" flip-flop to the set or on state (Q325 off, Q324 on). The collector of Q324 becomes less negative, and over an associated transistor (not shown) connected to conductor 167, effects the illumination of the "too strong" indicator lamp.

The collector of transistor Q325 is also connected to the input terminal 170 for the purpose of providing a negative signal over such terminal to reset the flip-flop CFF1 (160) and thereby stop the dose measuring timing operation. In the present example in which the memory unit comprises ten stages, and the "too strong" indicator is connected to operate when the last four bits 140-7, 140-8, 140-9, 140-10 of the memory unit change as indicated, the total number of counts is 512+256+128+64=960.

In the event that the dose is too weak, the "too weak" (or too old) indicator circuit 168 operates to provide a signal over conductor 169 which energizes the "too weak" indicator 90 (FIGURE 1).

With reference to the "too weak" indicator circuit 168 (FIGURE 8) the coincidence gate is comprised of four diodes, three of which are connected over conductors 146-8, 146-9, 146-10 to the last three bits of the main memory or scaler 70 and the fourth being connected to the emitter circuit of transistor Q317' which provides an indication of the condition of flip-flop CFF2 (set or reset). That is, a signal is coupled over such circuit to bias the diode 94 to cut-off whenever the flip-flop CFF2 has been reset as a result of the timer having completed its timing cycle of forty-one seconds.

Diodes 91, 92, 93, are connected to the reset or zero state of the last three flip-flops, and it is apparent that the "too weak" indicator circuit will operate if the number of counts does not reach the last three flip-flops and the total count in the memory is less than the $$1+2+4+8+16+32+64=127$$

When the timer runs out, and the last three bits are zero as a result of the dose being "too weak," diodes 91, 92, 93 remain in the cut-off state (less than the 127 counts in the memory) and diode 94 is cut-off, whereby a pulse is transmitted over capacitor C313 to turn on transistor Q323 which in turn sets the flip-flop 168 (Q320 on and Q321 off) and provide an energizing signal over conductor 169 which effects operation of the "too old" indicator 90 in the mode described above.

If neither the "too strong" nor the "too weak" indicator is operated after timer 120 has measured the time period of approximately forty-one seconds, the dose is acceptable, and an indicator circuit 134, 136 is used to effect energization of the "dose OK" indicator 135 or the lamp associated with the next instruction plate. That is, when neither the "too strong" nor "too weak" flip-flops have been changed from their reset stage, the voltage at the cathodes of the diode CR302 (too strong) and CR303 (too weak) is about −5.5 volts. As the control flip-flop CFF2 is reset as a result of the timer operation terminating in the manner above described, the cathode of CR301 is also changed to −5.5 volts, and the voltage at the base of transistor Q319 changes in the negative direction and the voltage at the collector goes positive. The resultant signal over the conductor 138 controls energization of the "dose OK" indicator 135 or of an amplifier for a lamp associated with the instruction plate "Withdraw pre-mix sample, inject dose, and return dose syringe to center well."

Thus, as the timer times out, to cut off the storing of pulses into scaler 70, one of the three indicators has been illuminated or otherwise energized, either the "too strong" indicator 80 or "too old" indicator 90, or the "OK" indicator 135, so that the operator of the apparatus knows whether he can proceed with the determination or must start again with a new dose.

STEP 3.—OPERATION OF CONTROL KNOB TO SUBTRACT RESIDUE POSITION

The next step, according to the method of the invention utilizing the illustrated apparatus, comprises the counting, over an identical period of time, of the residue remaining in the syringe 46 after injection into the patient, the blood volume of whom is to be determined. This is accomplished by moving the switches 50, 52, 54, 56, 58 to the "residue" position after inserting the used syringe 46 into the opening 40 as before. In this switch position, the pulses at the output of scaler 60 (FIGURE 6) are fed to the backward terminal 73 of scaler 70 to be subtracted from the pulses already stored in the scaler to provide a corrected or net dose count. This can be seen in graphical form in FIGURE 2. Under these circumstances, the reversible scaler 70 operates as before except that its backward line 142 is energized by its polarity flip-flop 152 to count backward pulses fed to the input 144 of the first section thereof. That is, as the first pulse is transmitted over the backward input conductor 73, capacitor C213, and diode 210, the state of the polarity flip-flop Q212, Q213 reverses (assuming the polarity flip-flop circuit is in the state set by the pulses received over the forward conductor 71 during dose measuring, i.e., transistor Q212 turned on and transistor Q213 turned off). The polarity level at the bases of transistors Q214, Q215 changes, and backward bias transistor Q214 turns on and forward bias transistor Q215 turns off to reverse the bias on the forward and backward bias conductors 141, 142. That is, the backward bias line 142 is now negative and the forward line 141 has a large positive or reverse bias.

As in the preceding example, the input pulse received over backward conductor 73 is applied to time delay univibrator circuit 156 which, after a few microseconds delay, effects the coupling of the pulse over conductor 158 to the first stage 140–1 of the scaler 70. Such delay is provided to enable the bias transistors Q214, Q215 to change the bias of forward and backward lines 141, 142 to the new state before the pulse is applied over count conductor 158 to the stepping register stages of the reversible scaler 70.

If the pulse coupled over conductor 158 to the next scaling bit to receive the count causes a change in the negative direction at the collector of the transistor in such stage which corresponds to the transistor Q205 in the first stage, then the transistor in such stage which corresponds to transistor Q216 in the first stage will produce a positive-going signal at its collector to provide a carry pulse in the backward direction. As the pulses are received over conductor 158 during subtract residue switch position, stepping proceeds in a backward mode to subtract the residue count from the dose count stored in scaler 70.

Again, upon the timing out of timer 120, i.e., approximately forty-one seconds for the residue count, an end of timer signal is transmitted over input 170 to flip-flop CFF1 to effect reset thereof, and cut-off of the pulses over the Schmidt circuit 162 to the timer 120. Additionally, flip-flop CFF2 is reset, which over conductor 165, closes the gate from the pulse generators 24, 34 to scaler 60 whereby the output of pulses from the pulse generators 24, 34 to the scaler 60 is cut off.

Following the dose and residue counting, the empty syringe 46 is removed from the central opening 40, the post-mix sample in its tube 25 is put into opening 26 and the pre-mix sample put into opening 36. As has been noted above, it is important in the use of the illustrated apparatus that the volume of sample in the containing tubes be great enough so that it extends entirely across the inner tube 14 of housing 12 so as to define a predetermined and specific volume for comparison with the unknown volume. Normally, the volume of blood withdrawn from the patient is so small with respect to the total volume that it may be ignored, but in some instances it may be necessary to subtract the withdrawn volume from the total volume to determine the net blood volume, although this does not affect the operation of the method or apparatus of the invention.

Because of the relatively low activity of the post-mix and pre-mix samples, the apparatus of the invention is arranged to couple them closely to their scintillators 28 and 38 to utilize as much of the activity thereof as possible, the spacing between the scintillators being sufficiently great so that the sample in one tube thereof does not affect the opposite scintillator. Effectively, then, each of the samples is counted separately but during the same time period so that any background effects such as from an adjacent X-ray machine will affect them identically and be cancelled as will hereinafter appear.

STEP 4.—OPERATION OF CONTROL KNOB TO "COMPUTE VOLUME" POSITION

With the samples positioned within the housing 12, switches 50, 52, 54, 56, 58 are advanced to the "compute volume" (or sample) position. This connects the photomultiplier pulse generators 24, 34, so that the pulses at the output of pulse generator 24 responsive to the activity of the post-mix sample, the more highly active of the samples, is connected directly to the backward terminal 73 of the reversible scaler 70 and the output of pulse generator 34 responsive to the activity of the pre-mix sample is connected directly to the forward terminal 71 of said scaler 70. At the same time, the scaler 70 is started so that the in-fed pulses will be counted in the scaler. However, since the backward terminal is connected to the more active sample in opening 26, the net count in the scaler will be a negative one, that is, the net count entering the scaler by the backward and forward terminals will result in decreasing the counts stored in the scaler during dose counting. This will continue until the count in the scaler reaches zero, with the next single count, as appears at the output 148 of the scaler 70 being passed as a "zero count" signal over input 170 to reset flip-flop 160 and terminate coupling of the pulses to the reversible scaler in the manner described heretofore. While this count-down is going on, however, the timer 120 has been moving the indicator 130 from its zero position along its scale so that the position of the indicator 130 is an indication of the time during which the backward counting to the "zero count" continued, as will be seen in the graph in FIGURE 2. With the indicator 130 suitably calibrated, the indicator needle will read directly in blood volume so that an immediate indication of blood volume in the patient is presented by the apparatus upon completion of the counting which takes no more than a few minutes. That is, the patient's blood volume minus whatever amount, usually negligible, of blood was extracted for the samples.

The blood volume determination having thus been completed, the apparatus may be reset for a new determination simply by moving switches 50, 52, 54, 56, 58 to the "reset" condition which will reset the circuitry by means of reset amplifier 116 in a conventional manner, the samples being removed in readiness for the counting of the new dose.

Thus, as to the operation of scaler 70 during the simultaneous sample counting operation, each successive pulse arriving either at the forward terminal 71 or the backward terminal 73 is enabled to step the entire scaler backward or forward according to the pulse source so that it may be either subtracted or added after being passed through the adder 154 and the time delay 156 to the input 144. Thus not only are means provided for conditioning the scaler 70 for addition or subtraction by setting all of its stages for appropriate stepping in response to an input pulse on either its forward or backward input terminals, but also such pulses from either terminal are added for counting after such stepping either in a backward or forward direction. The "scaler zero" signal is provided by a "1" output from the last stage, such being produced at the first scaler backward step after each of the stages reaches a "0" condition, indicating a "0" count of the entire scaler, that is, zero pulses stored therein. Similarly, the scaler could be reset to other conditions which could be used to define a "zero" condition. The number of stages in the scaler is selected to be sufficiently high to accommodate the maximum counts anticipated, herein ten stages providing a maximum count of $2^{10}$ being sufficient, although a scaler according to the invention having any number of stages can be provided.

It should be particularly noted that the structural and circuit considerations of the apparatus of the invention have been arranged to reduce the level of the highly active dose to a value of the order of that of the very much less active sample, so that a valid comparison of counts may be made. To this effect, note not only the presence of scaler 60 which reduces the dose and residue counts fed to reversible scaler 70 by a factor of 64, but also the positioning of the dose a substantial distance from the scintillator crystals 28, 38, as well as the use of radiation intensity reducing filters 44 and the central disc 42 which serves to reduce the direct radiation without so reducing the more indirect radiation. This latter is especially valuable in producing a more uniform level of radiation throughout a wider range to enable not only higher accuracy, but even the use of a variety of radiating isotopes without adjustment of the apparatus. This is particularly valuable in medical work wherein two of such isotopes, namely, iodine 131 and chromium 51 are much used.

Thus, it will be seen that the invention provides novel apparatus and methods for the determination of fluid volumes by radioactive means, such methods and apparatus being particularly adaptable to the measurement of human blood volumes, as well as providing methods for determining the age of biological samples as is particularly useful in the use of biological carrying agents for the radioactive material used in human blood volume measurement such as, for example, serum albumin.

It will be apparent to those skilled in the art that there may be made various modifications within the spirit of the invention and the scope of the appended claims.

What is claimed is:

1. Apparatus for detecting radiation comprising a radiation-shielding housing having wall means defining a predetermined area in which a radiation source thereat may be viewed from within said housing, a sample receptacle of generally tubular shape, means for positioning said sample receptacle within said housing in a predetermined position with a fixed predetermined volume in said viewing area, and with at least a portion of the interior of said receptacle extending beyond the margin of said viewing area and shielded from view from within said housing, a radioactive sample in said receptacle within said viewing area, scintillator means within said housing adjacent said portion of said receptacle exposed within said viewing area having a surface surrounding the portion of said receptacle containing said predetermined volume exposed within said viewing area, photosensitive means positioned to view said scintillator means, and output means for transmitting the signal output provided by said photosensitive means to associated pulse-responsive means.

2. Apparatus for detecting radiation in a plurality of samples comprising means for positioning radioactive samples, radiation detector means operatively associated with said sample positioning means for exposure to a sample positioned thereby and operative to generate output pulses responsive to radiation from a sample, pulse responsive means including counter means, first means for controlling advancement of the count in said counter means responsive to receipt of a first set of output pulses provided by said detector means in one measuring operation on a first sample, and second means for controlling decrease of the count in said counter means responsive to receipt of a second set of output pulses from said detector means in another measuring operation on a second sample.

3. Apparatus as claimed in claim 2 which includes means for terminating operation of said counter means responsive to a predetermined reference count value.

4. Apparatus as claimed in claim 2 which includes timer means operative with said counter means to determine the counting rate for a sample in said one measuring operation wherein advancement of the count is controlled by the first means.

5. Apparatus as claimed in claim 2 which includes timer means operative with said counter means to determine the counting rate for a sample in said one measuring operation wherein advancement of the count is controlled by the first means and in said another measuring operation wherein decrease of the count is controlled by the second means to determine the counting rate for a residual amount of said sample and means to deduct said last-mentioned counting rate from the counting rate determined in said one measuring operation to thereby provide a net sample counting rate.

6. Apparatus for detecting radiation in a plurality of samples comprising means for positioning a radiation sample, radiation detector means mounted for exposure to a sample at said sample positioning means and operative to generate output pulses responsive to radiation from said sample, selector means having a plurality of switching conditions, pulse responsive means including counter means, first means operative to advance the count in said counter means responsive to receipt from a first sample of a first set of output pulses provided by said detector means with said selector means in a first of said switching conditions, and second means for decreasing the count provided in said counter means responsive to receipt from a second sample of a second set of output pulses from said detector means with said selector means in a second one of said switching conditions.

7. Apparatus for measuring radiation in a plurality of samples comprising means for positioning radioactive samples, radiation detector means operatively associated with said sample positioning means for exposure to samples positioned thereby and operative to generate output pulses responsive to radiation from said samples, pulse responsive means including counter means, first means for controlling advancement of the count in said counter means responsive to receipt of a first set of pulses provided by said detector means in one measuring operation on a first sample, second means for controlling decrease of the count in said counter means responsive to receipt of a second set of pulses from said detector means in another measuring operation on a second sample, and selector means having a plurality of switching conditions, said selector means having a first condition for enabling said first means in the determination of the radioactivity of a dose sample in said sample positioning means, said selector means having a second condition for enabling said second means in the determination of the radioactivity of a residual amount of said does sample in said sample positioning means, and said selector means having at least one third condition for enabling said first means in the determination of the radioactivity of a pre-mix sample in said sample positioning means and for enabling said second means in the determination of the radioactivity of a post-mix sample in said sample positioning means.

8. Apparatus for detecting radiation comprising a radiation-shielding housing having wall means defining a predetermined viewing area, first and second sample positioning means on said housing for positioning a pair of radioactive samples within said viewing area, a pair of radiation detectors mounted within said housing to respectively view samples at said two sample positioning means and operative to generate pulses responsive to radiation from samples at said sample positioning means, means for positioning a third radioactive sample within said viewing area in a position wherein it is exposed to view by both of said detectors, means for storing pulse information received from both of said detectors, and means for enabling said pulse storage means to subtract from the pulse information stored in said storage means pulse information received from one of said detectors during a given time period and to store in storage means pulse information received from the other detector during the same time period.

9. Apparatus according to claim 8 wherein said apparatus comprises control circuit means including said pulse storage means connected to said detectors, switch means having a plurality of operative conditions, said switch means having a first condition for enabling said control circuit means in the determination of the radioactivity of a sample in said third sample positioning means, including means for transmitting the pulse information received from both of said detectors during a given period to said control circuit means, said switch means having a second condition for enabling said control circuit means in the determination of the radioactivity of a residual amount of said sample in said third sample positioning means, said second switch condition enabling said control circuit means to subtract from the pulse information stored in said storage means pulse information received from both of said detectors over a second period equal to said first mentioned period, and said switch means having a third condition for enabling said control circuit means in the determination of the radioactivity of two samples respectively in said first and second sample positioning means, said third switch condition enabling said control circuit means to subtract from the pulse information stored in said storage means pulse information received from one of said detectors in a given period of time and to store in said storage means pulse information received from the other of said detectors during the same time period.

10. Apparatus for detecting radiation including an extended tubular housing having viewing openings at its ends, central means positioning a radioactive sample centrally of said housing between its ends, off center means positioning another radioactive sample on each side of said central means, scintillator means mounted within said housing adjacent each of said off center means, photosensitive means positioned adjacent the viewing openings at each end of said tubular housing, providing output pulses responsive to scintillations produced by said scintillation means, electronic mean simultaneously responsive to said output pulses, said electronic means including reversible scaler means for storing pulse information simultaneously received over a predetermined period of time from said photosensitive means, and selectively for sequentially and simultaneously adding to and subtracting from said stored pulse information, to increase or decrease the quantity of said stored pulse information in said storage means, means responsive to the quantity of stored pulse information in said scaler when said stored pulse information reaches a value of zero, and switch means operative in one position to connect said scaler means to both of said photosensitive means to store pulses in said storage means by adding said pulses therein and in another position to connect scaler means to said photosensitive means to add the stored pulses received from one of said photosensitive means while simultaneously subtracting pulses received from the other of said photosensitive means to decrease the quantity of said stored pulses to a zero value.

11. Apparatus for measuring blood volume including an extended tubular housing having viewing openings at its ends, central means positioning a radioactive dose centrally of said housing between its ends, off center means positioning a radioactive sample on each side of said central means with said sample in tubular conguration of smaller cross section dimension than that of the interior of said tubular housing and extending across said housing to define a predetermined volume of said sample, scintillator means mounted within said housing adjacent each of said off center means to surround each of said samples within the housing, photosensitive means positioned adjacent the viewing openings at each end of said tubular housing, providing output pulses responsive to scintillations produced by said scintillation means, electronic means simultaneously responsive to said output pulses, said electronic means including a reversible scaler having an adding input and a subtracting input and a plurality of memory and stepping stages, means for selectively shifting all of said stages in backward or forward direction in response to pulses received at one or the other of two inputs to said scaler, and means connected to the first of said stages for adding pulses received at said inputs to count said added pulses, each pulse received at one of said inputs establishing the direction it is to be counted upon passing to said first stage for counting, a control circuit including timer means, scaler zero means responsive to the quantity of zero information in said scaler, and indicator means, said timer means being operative to cut off input of pulses to said scaler means after a predetermined time and said scaler zero means being operative to cut off said indicator means upon the occurrence of a scaler zero signal, and switch means operative in a first position to connect said scaler means adding input to both of said photosentitive means to store pulses in said storage means by adding said pulses therein until input of pulses is cut off by said timer means, operative in a second position to connect said scaler means subtracting input to both of said photosensitive means to subtract from the pulses stored therein until input of pulses is cut off by said timer means, and operative in a third position to connect said scaler means adding input to one of said photosensitive means and said scaler subtracting input to the other of said photosensitive means to add to the stored pulses received from one of said photosensitive means while simultaneously subtracting pulses received from the other of said photosensitive means to decrease the quantity of said stored pulses to a zero value to cut off said indicator means.

12. Apparatus for detecting radiation including an extended tubular housing having viewing openings at its opposite ends, central sample positioning means positioning a radioactive sample centrally of said housing between its ends, a pair of off center sample positioning means positioning other radioactivity samples spaced on each side of said central sample positioning means with each of said sample positioning means positioned generally along the axis of said housing and with said off center sample positioning means supporting samples in tubular configuration of smaller cross section dimension than that of the interior of said tubular housing to extend across said housing from one side to the other side thereof for viewing of a predetermined volume of said samples, scintillator means mounted within said housing adjacent each of said off center sample positioning means, a pair of photosensitive means positioned adjacent the viewing openings at each end of said tubular housing for viewing the interior of said housing in opposite directions along the axis thereof and toward one another and said scintillator means, said photosensitive means providing output pulses responsive to scintillations produced by said scintillator means, and electronic means responsive to said output pulses.

13. Apparatus for detecting radiation including an extended tubular housing having a viewing opening at one end, said tubular housing including a cylindrical radiation shield defining a cross-sectional area within the housing within which area a radiation source may be viewed to the exclusion of radiation sources radially outwardly of said cross-sectional area, sample positioning means positioning in said housing a removable radioactive sample receptacle having a closed end with a radioactive sample within said receptacle extending entirely across the viewed cross-sectional area defined by said radiation shield, with the closed end of said receptacle positioned at least not radially inwardly of the radiation shield, and with the minor dimension of said receptacle being substantially less than the viewed interior cross dimensions of said shield, so that said sample is supported in columnar form both below and above the inside dimension of said shield for viewing a predetermined volume of said sample defined by said shield, scintillator means mounted within said housing adjacent said sample positioning means, and photosensitive means positioned adjacent said viewing opening at said end of said tubular housing for viewing the interior of said housing along the axis thereof in a direction toward said scintillator means, said photosensitive means providing output pulses responsive to scintillations produced by said scintillator means.

14. Apparatus for detecting radiation including an extended tubular housing having a viewing opening at one end, said tubular housing including a cylindrical radiation shield defining a cross-sectional area within the housing within which area a radiation source may be viewed to the exclusion of radiation sources radially outwardly of said cross-sectional area, strong sample positioning means positioning a strong radioactive sample in said housing, weak sample positioning means located between said strong sample positioning means and said viewing opening positioning in said housing a removable weak radioactive sample receptacle having a closed end with a radioactive weak sample within said receptacle extending entirely across the viewed cross-sectional area defined by said radiation shield, with the closed end of said receptacle positioned at least not radially inwardly of the radiation shield, and with the minor dimension of said receptacle being substantially less than the viewed interior cross dimension of said shield, so that said weak sample is supported in columnar form both below and above the inside dimension of said shield for viewing a predetermined volume of said weak sample defined by said shield, scintillator means mounted within said housing surrounding said weak sample positioning means and extending entirely across and throughout the viewed cross-sectional area of said housing, and photosensitive means positioned adjacent said viewing opening at said end of said tubular housing for viewing the interior of said housing toward and generally in an axial line with both of said positioning means and with said scintillator means, said photosensitive means providing output pulses responsive to scintillations produced by said scintillator means.

15. The method of determining the volume of a fluid comprising the steps of extracting a pre-mix sample of said fluid, adding to said fluid a quantity of radio active material having a known counting rate, extracting a post-mix sample of said fluid containing said radioactive material, measuring the counting rate of a known volume of said post-mix sample, subtracting therefrom the counting rate of an equivalent volume of said pre-mix sample to provide a net sample counting rate, and determining the ratio of the known counting rate of the quantity of added radioactive material to the counting rate of said net sample and thereby the ratio of said unknown volume to said known volume.

16. The method as claimed in claim 15 wherein the counting rate of the radioactive material added to the fluid is determined by measuring the counting rate of an initial quantity of said radioactive material, measuring the counting rate of the unused residue remaining after the addition of a portion of said initial quantity of said radioactive material to said fluid, and subtracting the counting rate of said unused residue from the counting rate of the initial quantity of said radioactive material to thereby provide the counting rate of the portion of the radioactive material added to the fluid.

17. The method as claimed in claim 15 wherein the measurement of the counting rate of the pre-mix and post-mix samples takes place simultaneously, and the counting rate of the pre-mix sample is subtracted from that of the post-mix sample concurrently with the measurement of said counting rates.

18. Apparatus for detecting radiation in a predetermined volume of each of a plurality of samples contained in identical receptacles irrespective of the total volume of sample in each of said receptacles above a predetermined minimum level, comprising a radiation-shielding housing having wall means defining a predetermined viewing area in which a radiation source thereat may be viewed from within said housing, a radiation detector carried by said housing in a position to view said viewing area through the interior of said housing, a sample receptacle, and positioning means on said housing for removably accommodating said sample receptacle in a predetermined position within said viewing area in which position a portion of the interior of said receptacle extends at least to a margin of said viewing area, said sample receptacle being adapted to contain a sample of a size to fill said receptacle at least to a predetermined minimum level sufficient to fill the portion of said receptacle within said viewing area to thereby expose a predetermined volume of said sample to said radiation detector, said positioning means also being capable of successively accommodating in the same predetermined position other sample receptacles identical with said first-mentioned receptacle, wherefore successive placement in said predetermined position of such identical receptacles each containing at least said minimum level of a sample exposes said predetermined volume of each sample to the radiation detector irrespective of the total volume of sample in each receptacle.

19. Apparatus for detecting radiation comprising a radiation-shielding housing having wall means defining a predetermined viewing area in which a radiation source thereat may be viewed from within said housing, a radiation detector carried by said housing and including scintillator means at said viewing area and photosensitive means positioned to view said scintillator means, a sample receptacle, positioning means on said housing adapted to accommodate said receptacle in a predetermined position within said viewing area, said scintillator means having a surface substantially conforming to and coextensive with the external surface of said receptacle within said viewing area, output means for providing output signals from said photosensitive means, and pulse responsive means associated with said output means and responsive to signals received therefrom.

References Cited by the Examiner
UNITED STATES PATENTS

| | | | |
|---|---|---|---|
| 2,390,931 | 12/1945 | Fearon | 250—83.6 |
| 2,924,718 | 2/1960 | Packard | 250—106 |
| 2,976,421 | 3/1961 | Bayfield | 250—83.6 |
| 3,083,298 | 3/1963 | Parker | 250—106 |
| 3,108,184 | 10/1963 | Hull | 250—106 |
| 3,159,746 | 12/1964 | Powell | 250—83 |

OTHER REFERENCES

Radioactive Tracer Technique by Gore et al.: Journal of Petroleum Technology, September 1956, pp. 12 to 17.

Tracer Method Examines Human Blood Circulation: Applied Radiation Case History No. 2, Nucleonics, vol. 17, No. 7, July 1959, pp. 56 to 59.

Using Tracers in Refinery Control by Hull: Nucleonics, vol. 13 No. 4, April 1955, pp. 18 to 21.

RALPH G. NILSON, *Primary Examiner.*

JAMES W. LAWRENCE, *Examiner.*

A. R. BORCHELT, *Assistant Examiner.*